United States Patent
Hayafuchi et al.

(10) Patent No.: US 10,403,166 B2
(45) Date of Patent: Sep. 3, 2019

(54) MUSICAL PERFORMANCE ASSISTANCE DEVICE AND METHOD

(71) Applicant: YAMAHA CORPORATION, Hamamatsu-shi (JP)

(72) Inventors: Kouki Hayafuchi, Hamamatsu (JP); Jun Usui, London (GB)

(73) Assignee: YAMAHA CORPORATION, Hamamatsu-Shi (JP)

( * ) Notice: Subject to any disclaimer, the term of this patent is extended or adjusted under 35 U.S.C. 154(b) by 24 days.

(21) Appl. No.: 15/886,077

(22) Filed: Feb. 1, 2018

(65) Prior Publication Data
US 2018/0158358 A1 Jun. 7, 2018

Related U.S. Application Data

(63) Continuation of application No. PCT/JP2016/073054, filed on Aug. 5, 2016.

(30) Foreign Application Priority Data

Sep. 7, 2015 (JP) .................. 2015-176109

(51) Int. Cl.
*G09B 15/00* (2006.01)
*G09B 15/02* (2006.01)
(Continued)

(52) U.S. Cl.
CPC ............ *G09B 15/023* (2013.01); *G10G 1/00* (2013.01); *G10H 2210/066* (2013.01); *G10H 2210/091* (2013.01)

(58) Field of Classification Search
CPC .......... G09B 15/023; G10G 1/02; G10G 1/00; G06F 3/0202; G10H 2210/091; G10H 2210/066
(Continued)

(56) References Cited

U.S. PATENT DOCUMENTS 5,889,224 A * 3/1999 Tanaka ................. G10H 1/361
434/307 A
6,084,168 A * 7/2000 Sitrick ................. G09B 15/023
84/477 R
(Continued)

FOREIGN PATENT DOCUMENTS

JP 62052596 A 3/1987
JP 63004226 Y2 2/1988
(Continued)

OTHER PUBLICATIONS

International Search Report issued in Intl. Appln No. PCT/JP2016/073054 dated Sep. 20, 2016. English translation provided.
(Continued)

*Primary Examiner* — Jeffrey Donels
(74) *Attorney, Agent, or Firm* — Rossi, Kimms & McDowell LLP

(57) ABSTRACT

A display device displays a musical score image where musical notes indicative of individual tones or sounds constituting a music piece are arranged on a time axis and pitch axis. Pitch information indicative of one or more pitches is acquired in response to an operation on a keyboard, and a note matching any one of the one or more pitches indicated by the acquired pitch information is identified from among the notes included in the musical score image. When any note has been identified as matching any one of the one or more pitches indicated by the acquired pitch information, a display style of the matching note is changed. Only when no note has been identified as matching any one of the one or more pitches indicated by the acquired pitch information, a display mode of a portion of the musical score image other than the notes is changed.

13 Claims, 8 Drawing Sheets

(51) Int. Cl.
*G10H 1/00* (2006.01)
*G10G 1/00* (2006.01)

(58) Field of Classification Search
USPC .................................................... 84/477 R
See application file for complete search history.

(56) References Cited

U.S. PATENT DOCUMENTS

| | | | | |
|---|---|---|---|---|
| 7,323,629 | B2* | 1/2008 | Somani | G10H 1/0008 |
| | | | | 700/94 |
| 7,648,416 | B2 | 1/2010 | Chuuma et al. | |
| 8,431,809 | B1* | 4/2013 | Chan | G09B 15/02 |
| | | | | 84/470 R |
| 9,064,484 | B1* | 6/2015 | Jaaskelainen | G10H 1/361 |
| 9,911,354 | B2* | 3/2018 | Oliver | G09B 15/023 |
| 9,922,629 | B1* | 3/2018 | Whiteside | G10G 1/00 |
| 2003/0110925 | A1* | 6/2003 | Sitrick | G09B 15/002 |
| | | | | 84/477 R |
| 2011/0003638 | A1* | 1/2011 | Lee | G09B 15/00 |
| | | | | 463/35 |
| 2011/0203442 | A1* | 8/2011 | Raveendran | G09B 15/023 |
| | | | | 84/483.1 |
| 2013/0042746 | A1* | 2/2013 | Shau | G09B 15/023 |
| | | | | 84/483.1 |
| 2014/0320442 | A1* | 10/2014 | Chan | G09B 15/023 |
| | | | | 345/174 |
| 2018/0122260 | A1* | 5/2018 | Walder | G09B 15/023 |

FOREIGN PATENT DOCUMENTS

| | | |
|---|---|---|
| JP | 63106781 A | 5/1988 |
| JP | 2001070636 A | 3/2001 |
| JP | 2002306841 A | 10/2002 |
| JP | 2006267667 A | 10/2006 |
| JP | 2008058753 A | 3/2008 |
| JP | 2014178361 A | 9/2014 |
| JP | 2015079183 A | 4/2015 |

OTHER PUBLICATIONS

Written Opinion from the International Search Authority issued in Intl. Appln. No. PCT/JP2016/073054 dated Sep. 20, 2016.
Written Opinion from the International Preliminary Examining Authority issued in Intl. Appln. No. PCT/JP2016/073054 dated Jun. 20, 2017.
International Preliminary Report on Patentability issued in Intl. Appln. No. PCT/JP2016/073054 dated Sep. 5, 2017. English translation provided.
"Portatone EZ-J220, Owner's Manual." 2012: 1-60. Yamaha Corporation. Japan. English translation provided.

* cited by examiner

| Nn=1 | $KC_1$ |
|---|---|
| Nn=2 | $KC_2$ |
| Nn=3 | $KC_3$ |
| ⋮ | ⋮ |
| Nn=z | $KC_z$ |

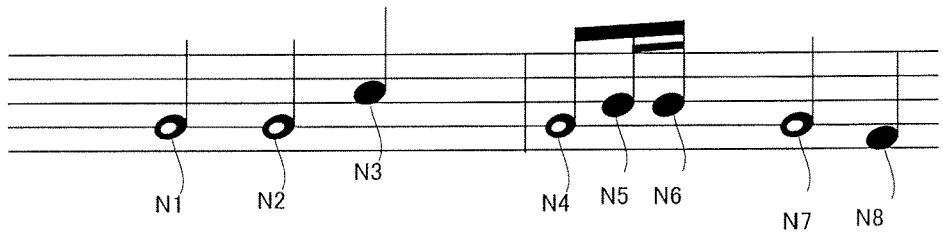
FIG. 8
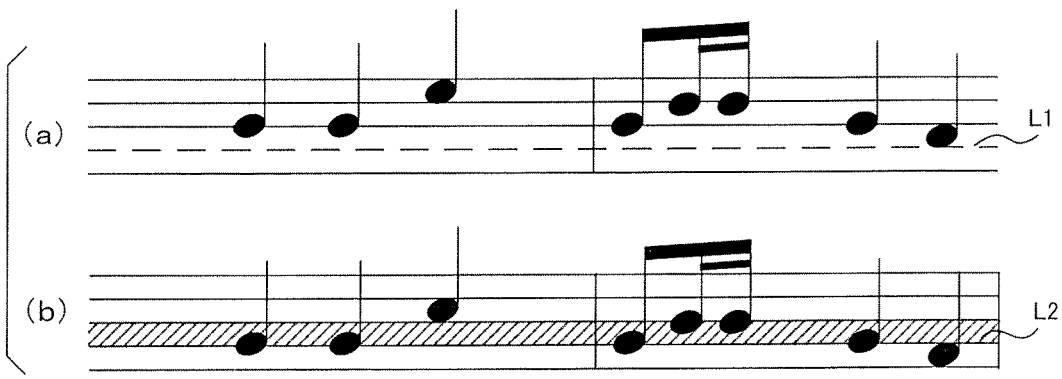
FIG. 9
FIG. 10
FIG. 11

KEY DEPRESSION HISTORY BUFFER Z

| Z(0) | i |
|---|---|
| Z(−1) | KD(−1) |
| Z(−2) | KD(−2) |
| Z(−3) | KD(−3) |
| ⋮ | ⋮ |

MUSICAL PERFORMANCE ASSISTANCE DEVICE AND METHOD

BACKGROUND

The present invention relates to musical performance assistance devices and methods for use in practice of a music piece.

In music education, it is essential and important to mater musical scales. Thus, there has heretofore been known a method for mastering musical scales, which uses a music board provided with: a keyboard section simulating a keyboard; and a musical staff notation section simulating a musical staff. The music board is constructed to allow a user to master a musical scale by not only illuminating on the keyboard section each key depressed on a keyboard musical instrument but also illuminating on the musical staff notation section a note indicative of a pitch (i.e., tone pitch) corresponding to the depressed key. For example, Japanese Utility Model Publication No. SHO-63-4226 (hereinafter referred to as "Patent Literature 1") discloses such a music board.

However, because the music board is a training material intended for assistance in musical scale mastering, it is constructed to merely display correspondence relationship between the keys and positions, on the staff, of pitches corresponding to the keys; in other words, it is never associated with a performance of a music piece. To repeat practicing of a music performance using such a music board would not be much fun to the user. Further, with the practice using the music board, the user cannot be expected to appropriately master a performance of a music piece and master how to read a musical score.

Further, a performance guide function in an electronic keyboard musical instrument etc. has been known as a method for mastering a performance of a music piece. The performance guide function is designed to illuminate keys to be depressed to perform the music piece and display notes and fingering on a display section. However, such a performance guide function is arranged to automatically advance a position to be practiced of the music piece in accordance with a predetermined reproduction tempo or in response to a key depressing operation. Namely, the illumination of keys to be depressed and the display of notes to be performed are executed only for a position to be currently performed on the basis of a progression of the music piece, i.e., only for a particular portion of the music piece. For example, "Owner's Manual of YAMAHA Digital Keyboard EZ 220" (in English) and "Owner's Manual of YAMAHA Portatone EZ J220" (in Japanese) both published by YAMAHA Corporation in 2012 (hereinafter referred to as "Non-patent Literature 1") discloses such a performance guide function.

SUMMARY OF INVENTION

In view of the foregoing prior art problems, it is an object of the present invention to provide an improved performance assistance device and method which can enhance a music-piece learning effect.

According to the present invention, there is provided an improved performance assistance device, which comprises: a display device which displays a musical score image based on musical score data for displaying a musical score image where notes indicative of individual sounds constituting a music piece are arranged on a time axis and a pitch axis; an acquisition circuitry which acquires pitch information indicative of one or more pitches; and a processor configured to: identify, from among the notes included in the musical score image, each note matching any one of the one or more pitches indicated by the acquired pitch information; change, when any note has been identified as matching any one of the one or more pitches indicated by the acquired pitch information, a display style of a note image itself of the identified note in the musical score image; and change, along the time axis, only when no note has been identified as matching any one of the one or more pitches indicated by the acquired pitch information, a display style of one or more particular parts indicative of one or more positions on the pitch axis corresponding to the one or more pitches indicated by the acquired pitch information in a portion of the musical score image other than the notes.

With the aforementioned construction, the performance assistance device of the present invention can change the display style of each note that has been identified by the identification section as matching the acquired pitch information from among the notes in the musical score image displayed on the display device. Thus, a user can know or identify which of the notes in the musical score image corresponds to the acquired pitch information. Further, when any note matching any one of the one or more pitches indicated by the pitch information is not present in the musical score image, the display style of a portion of the musical score image other than the notes is changed. By such a display style change, the present invention can let the user know that any note matching any one of the one or more pitches indicated by the pitch information is not present in the musical score image. Thus, the user can visually identify or ascertain correspondence relationship between the individual notes in the musical score image and the acquired pitch information, and therefore, the user is allowed to do performance practice of a music piece very smoothly. Furthermore, the user can read or grasp pitches of the individual notes indicated on the musical score easily and efficiently without accurately reading the musical score image, as a result of which the user can read the musical score of the music piece which he or she wants to perform. Besides, because the present invention is constructed to visually present the correspondence relationship between the individual notes in the musical score image and the acquired pitch information, it allows the user to do partial performance practice of any desired portion of the music piece easily as compared to the aforementioned conventionally known performance guide function where a position to be practiced (to-be-practiced position) of the music piece is automatically advanced.

In a case where the acquired pitch information is indicative of a plurality of pitches, the display style of each of notes corresponding to the plurality of pitches is changed. Thus, the user can readily identify or grasp a particular performance pattern, repetitive portion, mutually similar performance patterns, chord portion, broken chord, broken-chord-like portion in a melody, etc. that frequently occur in music pieces. Such arrangements can facilitate partial practicing of a music piece and intensive practicing of a particular pattern in a music piece and facilitate understanding of a construction of a music piece (e.g., where and how repetitive patterns and chords are placed in a music piece). Further, the aforementioned arrangements of the invention allow the user to, for example, readily identify a passing tone in a melody and catch a grasp of a melody line (e.g., matter as to whether the melody is a harmonic melody or a non-harmonic melody, or a chromatic-scale melody). These advantages of the present invention can significantly contribute to an enhanced efficiency and effect of performance learning of music pieces.

Furthermore, the present invention may be constructed and implemented also as a method invention and as a program invention.

The performance assistance device of the present invention constructed in the aforementioned manner achieves the superior advantageous benefit that it can significantly enhance the effect of performance learning of music pieces by use of a novel performance assistance function that visually presents correspondence relationship between individual notes in a musical score image and pitch information.

BRIEF DESCRIPTION OF DRAWINGS

Certain preferred embodiments of the present invention will hereinafter be described in detail, by way of example only, with reference to the accompanying drawings, in which:

FIG. 8 is a diagram showing an example construction of a key depression register;

FIG. 9 is a diagram showing a modification of a display style change of notes displayed on the musical staff;

FIG. 10 is a diagram explanatory of display style changes of positions on the staff corresponding to pitch information;

FIG. 11 is a diagram showing an example of a musical score image where the display styles of a plurality of notes and positions on the staff corresponding to a plurality of pitches have been changed;

FIG. 15 is a diagram showing an example construction of a key depression history register; and FIG. 16 is a diagram showing examples of a combo display on the staff.

DETAILED DESCRIPTION

Hereinafter, embodiments of the present invention will be described in detail with reference to the accompanying drawings.

Figure 1:
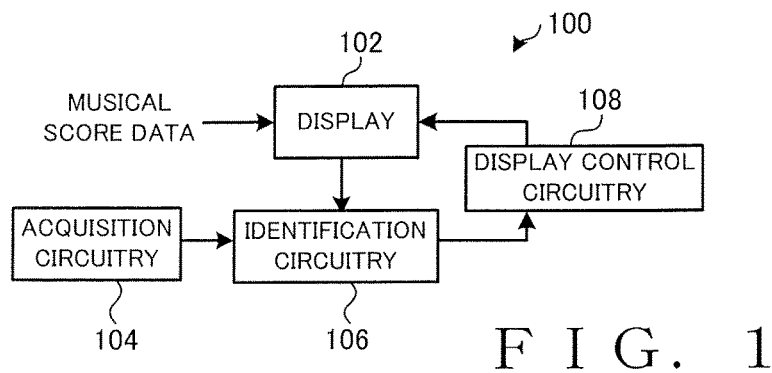
FIG. 1 is a block diagram explanatory of a conceptual construction of a performance assistance device of the present invention.

FIG. 1 shows an example conceptual construction of a performance assistance device according to an embodiment of the present invention. The performance assistance device 100 includes: a display 102 that displays a musical score image on the basis of musical score data for displaying a musical score image where notes indicative of individual notes constituting a music piece are arranged on a time axis and a pitch axis; an acquisition circuitry 104 that acquires pitch information indicative of one or pitches; an identification circuitry 106 that identifies, from among the notes included in the musical score image, notes matching the pitches indicated by the acquired pitch information; and a display control circuitry 108 which, when there are one or more notes matching the pitches indicated by the acquired pitch information, changes a display style of all the notes matching the pitches indicated by the acquired pitch information, and which, when there is no note matching the pitches indicated by the acquired pitch information, changes a display style of a portion of the musical score image other than the notes.

The performance assistance device 100 displays on the display 102 a musical score image of a music piece. A user operates, for example, a keyboard (not shown) connected to the acquisition circuitry 104, while viewing the displayed musical score image. The performance assistance device 100 acquires, by means of the acquisition circuitry 104, pitch information indicative of a pitch of each key depressed by the user. In other word, the acquisition circuitry 104 functions as a performance detection circuitry. Then, the performance assistance device 100 identifies, from among the individual notes in the musical score image displayed on the display 102, a note matching the acquired pitch. Then, the identification circuitry 106 either changes the display style of the note matching the acquired pitch or changes the display style of a portion of the musical score image other than the notes. In this manner, the user can visually ascertain correspondence relationship between the notes in the musical score image and the pitch information. Thus, the user can smoothly do performance practice of the music piece.

Figure 2:
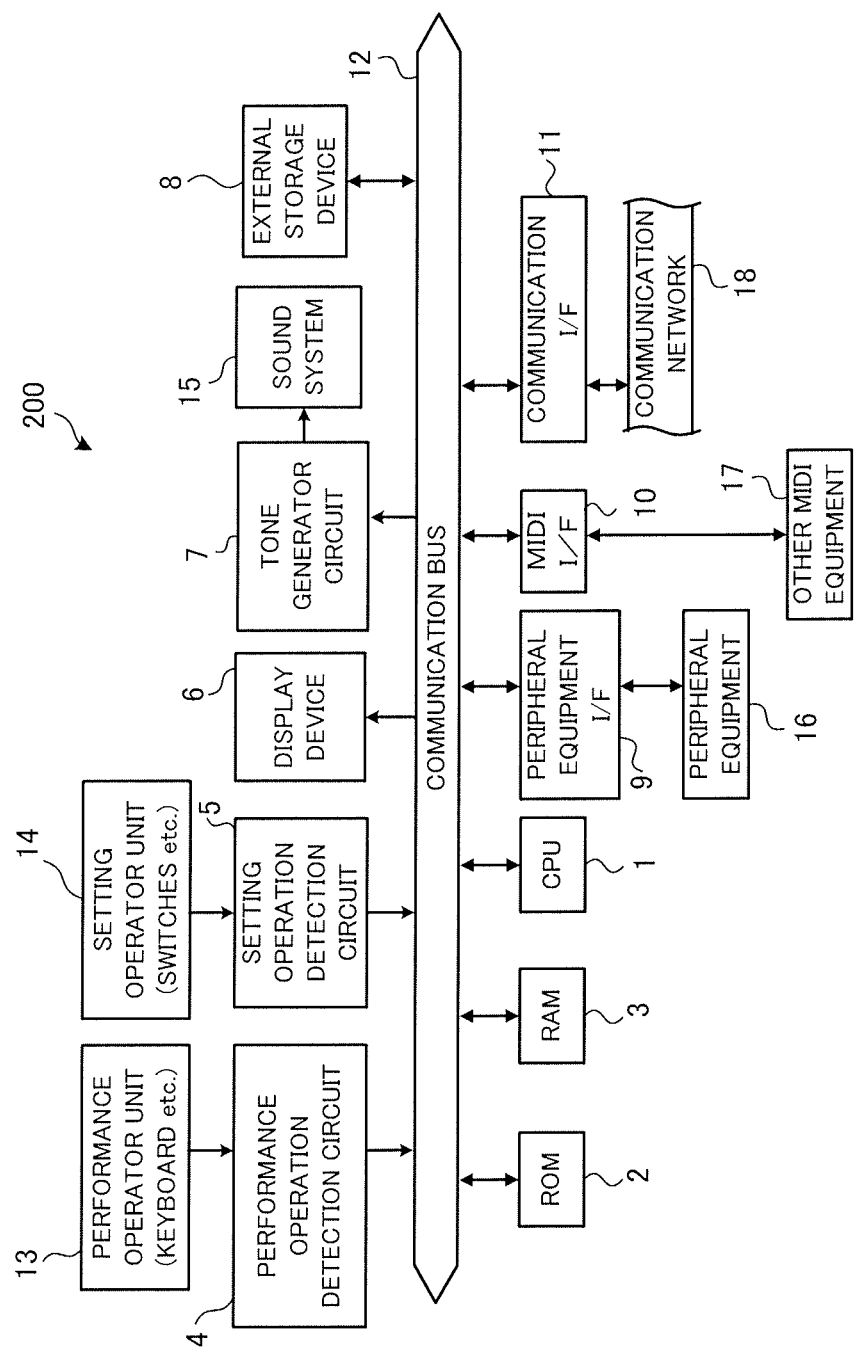
FIG. 2 is a block diagram showing an electric hardware setup of an electronic keyboard musical instrument having the performance assistance device shown in FIG. 1 applied thereto.

FIG. 2 shows an electric hardware setup of an electronic keyboard musical instrument having the performance assistance device 100 of FIG. 1 applied thereto. In FIG. 2, the electronic keyboard musical instrument 200 includes: a microprocessor unit (CPU) 1; a read-only memory (ROM) 2; a random-access memory (RAM) 3; a performance operation detection circuit 4; a setting operation detection circuit 5; a display device 6; a tone generator circuit 7; an external storage device 8; a peripheral equipment interface (peripheral equipment I/F) 9; a MIDI interface (MIDI I/F) 11; and a communication interface (communication I/F) 11. The CPU 1 is connected to the various components 2 to 11 via a communication bus 12 so that various data and control signals can be communicated between the CPU 1 and the various components 2 to 11.

The CPU 1 controls the overall operation or behavior of the electronic keyboard musical instrument 200 by executing various programs stored in the ROM 2 or the RAM 3. The ROM 2 and the RAM 3 not only store various programs to be executed by the CPU 1, various data, etc. but also are used as a loading area for a program to be executed by the CPU 1 and as a loading area for the programs to be executed by the CPU 1 and a working area for the CPU 1. The external storage device 8 comprises a hard disk; an FD (flexible disk or floppy disk (registered trademark)), a CD (compact disk), a DVD (Digital Versatile Disk), a semiconductor memory like a flash memory, and/or the like. The ROM 2, the RAM 3 or the external storage device 8 is capable of storing musical score data of a plurality of music pieces.

To the performance operation detection circuit 4 is connected a performance operator unit 13 operable for inputting pitch information. The performance operation detection circuit 4 detects an operation event of the performance operator unit 13 and outputs a detection signal corresponding to the detected operation event to the communication bus 12. Based on the detection signal, the CPU 1 generates performance information that is, for example, in the MIDI (Musical Instrument Digital Interface) format. The performance operator unit 13 comprises, for example, a keyboard including a plurality of keys. In this case, a key depression event including a tone generating instruction and pitch information designating a pitch is generated in response to a key depressing operation, and a key release event including a tone deadening instruction and pitch information designating a pitch is generated in response to a key releasing operation.

Further, to the setting operation detection circuit 5 is connected a setting operator unit 14 operable for inputting various information. The setting operator unit 14 includes a group of switches for making various settings, such as ON/OFF switching of a later-described "play assist function", tone color setting and music piece selection. The setting operation detection circuit 5 detects an operation event of the setting operator unit 14 and outputs to the communication bus 12 a detection signal corresponding to the detected operation event.

The display device 6, which comprises for example a liquid crystal display, displays various information based on display control signals received from the CPU 1 via the communication bus 12. The CPU 1 is capable of displaying on the display device 6 a musical score image based on musical score data.

Further, a sound system 15 is connected to the tone generator circuit 7. The tone generator circuit 7 electronically generates a tone signal based on performance information generated by the CPU 1. The tone generator circuit 7 may be one constructed using any conventionally-known tone synthesis technique, such as an FM tone generator, a PCM tone generator or a physical model tone generator. Further, the tone generator circuit 7 may comprise a hardware tone generator device or software processing performed by the CPU 1 or a DSP (Digital Signal Processor). The sound system 15 includes a digital-to-analog converter, an amplifier, a speaker, etc. and audibly reproduces or sounds a tone signal generated by the tone generator circuit 7.

Further, the electronic keyboard musical instrument 200 is capable of connecting thereto, via the peripheral equipment I/F 9 like a USB or IEEE1394 I/F, peripheral equipment 16, such as a tablet terminal (e.g., iPad (registered trademark)), a portable terminal like a portable phone or a PDA, and/or a personal computer in a wired or wireless fashion. Note that, in this specification, the term "portable terminal" and the term "peripheral equipment" are used interchangeably. In addition, the electronic keyboard musical instrument 200 is connectable via the MIDI I/F 10 with other MIDI equipment 17 in a wired or wireless fashion. Furthermore, the electronic keyboard musical instrument 200 is communicatively connectable via the communication I/F 11 with a server computer etc. residing on the communication network 18.

In the electronic keyboard musical instrument 200, one embodiment of the performance assistance device 100 of the invention is configured to display on the display device 6 a musical score image of a music piece on the basis of musical score data stored in the ROM 2, RAM 3 or external storage device 8 (function of the display 102 of FIG. 1) and acquire pitch information by means of the performance operation detection circuit 4 and the performance operator unit 13 (function of the acquisition circuitry 104 of FIG. 1), and the CPU 1 is configured to perform operations (i.e., later-described steps S17, S18, S21 and S22 of FIG. 7) corresponding to the identification circuitry 106 and the display control circuitry 108 of FIG. 1.

Figure 3:
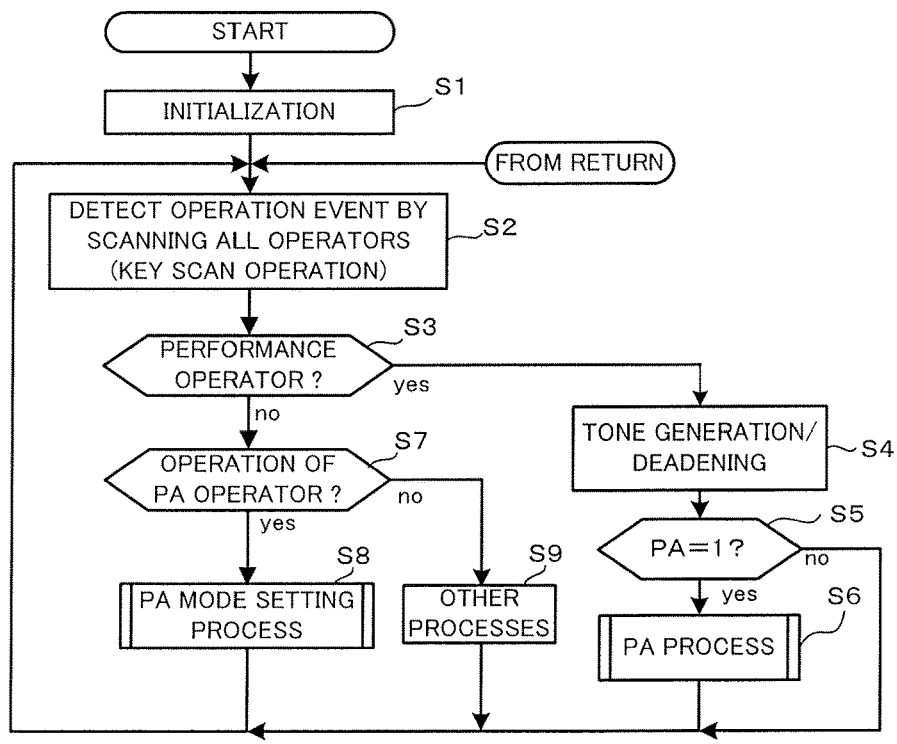
FIG. 3 is a flow chart showing an example of main processing performed in the electronic keyboard musical instrument shown in FIG. 2.

FIG. 3 is a flow chart showing an example of main processing performed in the electronic keyboard musical instrument 200. This main processing is started in response to powering-on of the electronic keyboard musical instrument 200. At step S1, the CPU 1 starts execution of various control programs and performs initial setting, such as for setting initial values into individual registers. At next step S2, the CPU 1 detects an operation event by scanning all of the operators belonging to the performance operator unit 13 and the setting operator unit 14. Upon detection of any operation event, the CPU 1 performs operations at and after step S3.

When any operation event of the setting operator unit 14 has been detected ("no" determination at step S3), the CPU 1 determines whether or not the operated operator of the setting operator unit 14 is a play assist (i.e., performance assistance) setting operator (hereinafter, "play assist" will be referred to simply as "PA"). The PA setting operator is an operator for switching between ON and OFF states of a "PA mode". When the PA setting operator has been operated ("yes" determination at step S7), the CPU 1 performs a "PA setting process" at step S8, as will be described in detail later. When any other setting operator of the setting operator unit 14 than the PA setting operator has been operated ("no" determination at step S7), the CPU 1 performs a process (any one of "other processes" in the figure) that corresponds to the setting operator operated, at step S9. The other processes in the figure include, for example, a tone color setting process, an effect parameter setting process, a music piece selection process corresponding to an operation for selecting a music piece as an object of display for which a musical score image is to be displayed.

Figure 4:
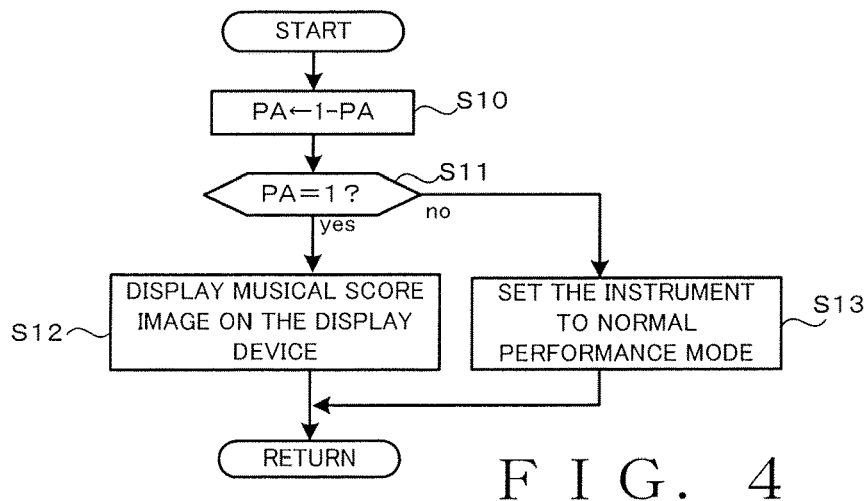
FIG. 4 is a flow chart showing an example of a play assist mode setting process.

FIG. 4 shows an example of the aforementioned PA setting process at step S8. At step S10, the CPU 1 inverts a value of a PA mode flag ("PA" in the figure). The PA mode flag takes a value "1" when the PA mode is ON, while it takes a value "0" when the PA mode is OFF. By the aforementioned step S10, the PA mode is switched between the ON state and the OFF state each time the PA setting operator is operated.

When the PA mode flag has been switched to the value "1", i.e. when the PA mode has been switched to the ON state ("yes" determination at step S11), the CPU 1 goes to step S12 to display on the display device 6 a musical score image based on musical score data of a music piece selected as an object of display for which a musical score image is to be displayed. For example, sets of musical score data of a plurality of music pieces are prestored in the ROM 2, RAM 3 or external storage device 8. The user can select any one of the plurality of music pieces as an object of display. The CPU 1 reads out from the memory 2, 3 or 8 the musical score data of the one music piece selected as the object of display. The selection of such a music piece as the object of display may be made either at the time of step S12 above or each time a music piece selection operation is performed using the setting operator unit 14. Further, the selected state of such a music piece as the object of display may be maintained after turning-off of the PA mode so that the musical score image of that selected music piece thus maintained as the object of musical score display is displayed next time the PA mode is turned on. Note that the musical score data to be used here may be musical score data prestored in an externally connected device, such as the peripheral equipment 16, or in the server computer residing on the communication network 18, rather than those prestored the memory 2, 3 or 8 in the electronic keyboard musical instrument 200. The CPU 1 acquires musical score data of a music piece selected as an object of display from the externally connected device, the server computer on the communication network 18 or the like, and then displays on the display device 6 a musical score image based on the acquired musical score data.

Figures 5, 6:
FIG. 5 is a diagram showing an example of a musical staff displayed on a display device.
FIG. 6 is a diagram showing an example construction of a note register.

In one embodiment of the invention, each musical score image comprises a musical staff where notes corresponding to individual tones constituting a music piece are arranged on a five-line musical staff. FIG. 5 shows an example of such a musical score image comprising a musical staff notation. In the musical staff notation, as well known in the art, the horizontal (left-right) direction represents a time axis while the vertical (up-down) direction represents a pitch axis. The five lines are a set of five horizontal lines, and these horizontal lines and spaces between the horizontal lines (hereinafter referred to as "inter-line spaces") represent different pitches. Each note is placed on any one of the lines or inter-line spaces representing a corresponding pitch. The inter-line spaces also include one outside (immediately above) the uppermost line of the five lines and one outside (immediately below) the lowermost line. Note that, when a pitch higher or lower than the pitches expressable on the five lines and inter-line spaces is to be represented, a note of that pitch is placed on a provisionally added line (i.e., ledger line) or inter-line space. Note that, in the specification, the above-mentioned five lines will hereinafter be referred to, from the lowermost line upward, as "first line", "second line", "third line", . . . , and the above-mentioned inter-line spaces will hereinafter be referred to, from the lowermost inter-line space upward, as "first inter-line space", "second inter-line space", . . . . Further, the ledger lines located below the five lines will hereinafter be referred to, from the one closest to the five lines downward, as "first lower ledger line", "second lower ledger line", . . . , and the inter-line spaces located below the five lines will hereinafter be referred to, from the one closest to the five lines downward, as "first lower inter-line space", "second lower inter-line space", . . . . Similarly, the ledger lines located above the five lines will hereinafter be referred to, from the one closest to the five lines upward, as "first upper ledger line", "second upper ledger line", . . . , and the inter-line spaces located above the five lines will hereinafter be referred to, from the one closest to the five lines upward, as "first upper inter-line space", "second upper inter-line space", . . . . Such a five-line musical staff defines pitches in a diatonic scale, and a chromatic scale is expressed by accidentals (key signature and accidental notations). The musical score data comprises, for example, data that include note data specifying a position on the time axis and a pitch for each of notes corresponding to tones constituting a music piece, and that are constructed in such a manner that the individual notes based on the note data are drawn on the staff.

Once the CPU 1 displays the musical score image at step S12 above, it acquires pitch information KC each indicative of a pitch of one of notes in the displayed musical score image and stores the acquired pitch information KC into a note register. Such information KC each indicative of a pitch of one of the notes is acquirable, for example, on the basis of the note data included in the musical score data. FIG. 6 shows an example of the note register. As shown in FIG. 6, the note register stores pitch information $KC_1$, $KC_2$, $KC_3$, . . . , $KC_z$ of all notes (a plurality z of notes) present or included in the musical score image, being displayed on the display device 6, into respective register Nos. Nn (n=1, 2, . . . , z), for example, in chronological order in which the notes appear. For example, the pitch information of the note N1 that appears first in the musical score image (see FIG. 5) is stored as "$KC_1$," into the register No. Nn=1, and the pitch information of the note Nz (see FIG. 5) that appears last in the musical score image (see FIG. 5) is stored as "$KC_z$," into the register No. Nn=z. Where a plurality of notes appear at the same time, like notes representing a chord, the note register stores the pitch information KC in an appropriate order, such as a rising order of pitches.

Note that the musical score image display operation and pitch information KC acquisition operation at step S12 may be performed not only in response to turning-on of the PA mode, but also when a new musical score image is to be displayed, such as when a musical score image change has been instructed by the user.

When the PA mode flag has been switched to the value "0", i.e. when the PA mode has been switched to the OFF state ("no" determination at step S11), on the other hand, the CPU 1 goes to step S13 to set the electronic keyboard musical instrument 200 to operate in a normal performance mode. The normal performance mode is a mode in which a later-described PA process is prevented from being performed in response to operations of the performance operator unit 13. Following step S12 or step S13, the CPU 1 ends the PA mode setting process and then returns to step S2 of FIG. 3.

Referring back to FIG. 3, when any operation event of the performance operator unit 13 has been detected at step S2 above, i.e., a key depression event or a key release event of one or more keys has been detected at step S2 ("yes" determination at step S3), the CPU 1 goes to step S4 to perform a tone generation process and a tone deadening process based on the detected key depression event or key release event. Namely, the CPU 1 generates performance information corresponding to the key depression event or key release event and transmits the thus-generated performance information to the tone generator circuit 7. Then, the tone generator circuit 7 generates a tone signal based on the generated performance information and audibly generates and deadens, via the sound system 15, a tone corresponding to the generated tone signal.

Then, at step S5, the CPU 1 determines, on the basis of the current value of the PA mode flag, whether the PA mode is ON or OFF. If the PA mode is ON ("yes" determination at step S5), the CPU performs the later-described PA process at step S6 and then returns to step S2. If the PA mode is OFF ("no" determination at step S5), on the other hand, the CPU 1 returns to step S2 without performing the PA process at step S6.

Figure 7:
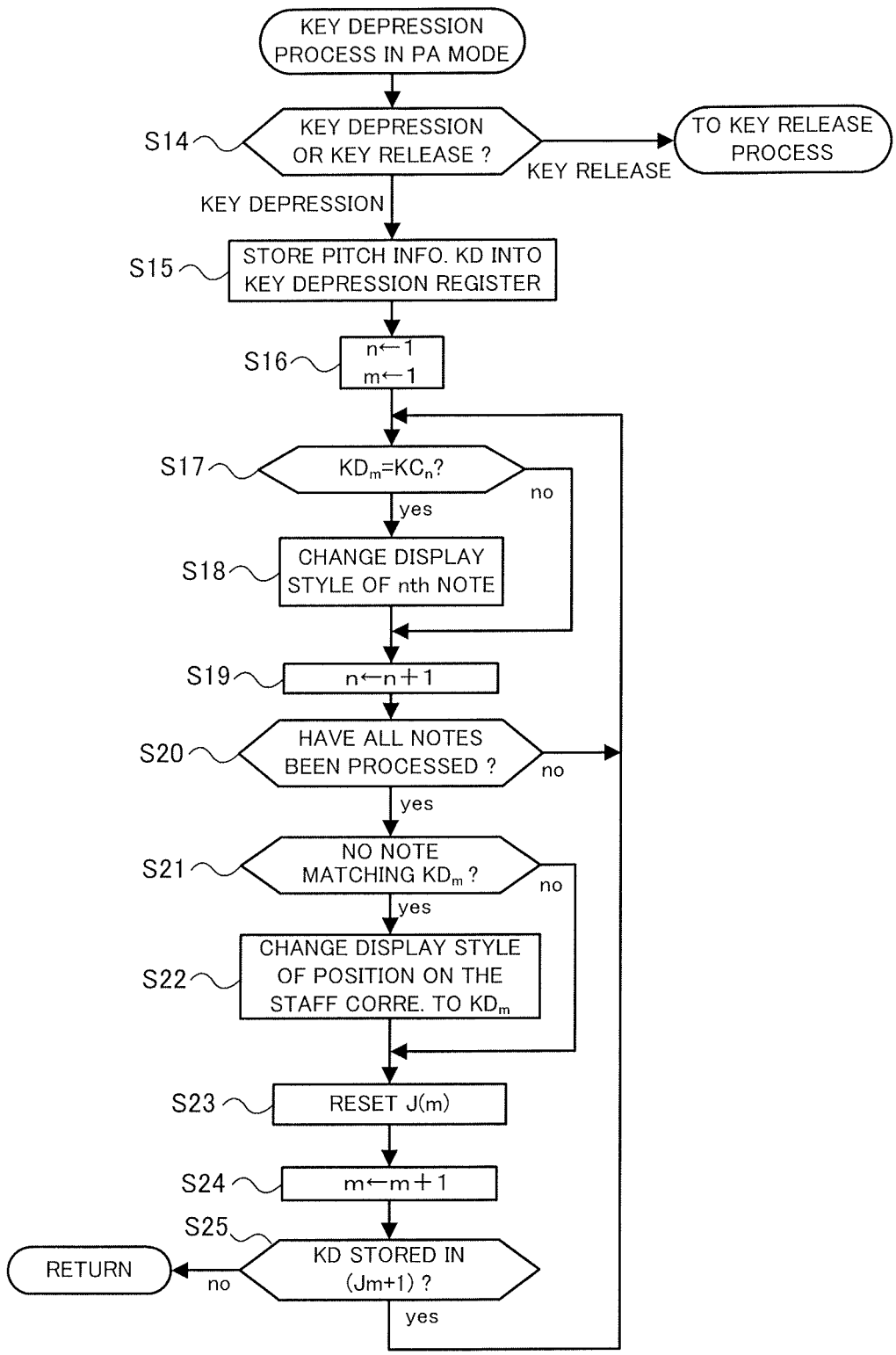
FIG. 7 is a flow chart showing an example of a key depression process in the play assist mode.

FIG. 7 is a flow chart showing an example of the PA process of step S6. First, at step S14, the CPU 1 determines which of key depression and key release events the key operation event detected at step S2 is. When one or more key depression events have been detected ("key depression" at step S14), the CPU 1 stores pitch information KD indicated by each of the key depression events into a key depression register, at step S15. FIG. 8 shows an example construction of the key depression register. As shown in FIG. 8, the key depression register stores into respective register Nos. J(m=1, 2, 3, . . . ) pitch information KD ($KD_1$, $KD_2$, $KD_3$, . . . of the individual key depression events detected at step S2 above. When key depression events of three keys have been detected substantially at the same time, for example, the CPU 1 stores the pitch information $KD_1$ of one of the depression events into the register No. J(1), the pitch information $KD_2$ of another of the depression events into the register No. J(2), and the pitch information $KD_3$ of the other of the depression events into the register No. J(3).

At step S16, the CPU 1 sets, as objects of processing, the note N1 corresponding to the register No. Nn=1 of the note register and the key depression event J(1) corresponding to the register No. J(m)=1 of the key depression register. At following step S17, the CPU 1 compares the pitch information $KC_1$ set as the object of processing (i.e., to-be-processed pitch information $KC_1$) and the pitch information $KD_1$ set as the object of processing (i.e., to-be-processed pitch information $KD_1$), and if the compared two pitch information $KC_1$ and $KD_1$ matches each other ("yes" determination at step S17), the CPU 1 changes a display style of the note N1 set as the object of processing (i.e., to-be-processed note). Changing the display style of the note (note display style) here means making the display style of the note in the musical score image, being displayed on the display device 6, from a normal display style, and, here, the note display style may be changed in any of various conventionally-known manners. More particularly, the note display style may be changed, for example, by changing a display color, colorfulness, clarity and/or the like of the note image, blinking the note image, changing a blinking period of the note image, and/or the like. The display style of the entire note image may be changed, or the display style of a part of the note image, such as only the notehead of the note image, may be changed (in other words, the display style may be differentiated between the notehead and the stem). Alternatively, the display style of a portion near the note image may be changed, such as by faintly adding a color to a portion around the notehead. If the compared two pitch information $KC_1$ and $KD_1$ does not match each other ("no" determination at step S17), the CPU 1 proceeds to step S19 without performing the operation of step S18.

At step S19, the CPU 1 switches to the register No. N(n+1) indicative of a next or new to-be-processed note and performs the operations of steps S17 to S19 on the new to-be-processed note N(n+1). For example, if the preceding or last to-be-processed note is N1, the note N2 corresponding to the register No. Nn=2 is set as the new to-be-processed note. Then, the CPU 1 repeats the operations of steps S17 to S19 while returning to step S17 in response to a "no" determination at step S20, until the operations of steps S17 to S19 are completed on all of z notes appearing in the musical score image. Once the determination at step S20 becomes "yes", the CPU 1 proceeds to step S21.

FIG. 9 shows a modification of the note display style change, which particularly shows a state where the display style of all notes N1, N2, N4 and N7 indicative of pitch "G" of various notes displayed in a musical score image has been changed in response to a depressing operation on a key having pitch "G" allocated thereto. Namely, the display style of the notes N1, N2, N4 and N7 is changed to a different display style from the notes N3, N5, N6 and N8 displayed in the normal display style. In illustrated examples of FIGS. 9 and 11, quarter notes and eighth notes changed in their display style are each depicted with the notehead (in black color) having a white dot placed therein while half notes changed in their display style are each depicted with the notehead (in while color) having a black dot placed therein.

Referring back to FIG. 7, at step S21, the CPU 1 checks all of the pitch information "$KC_1$", "$KC_2$", "$KC_3$", . . . , "$KC_z$" stored in the note register and determines whether none of the notes in the musical score image corresponds to or matches the to-be-processed pitch information $KD_1$. If none of the notes in the musical score image matches the to-be-processed pitch information $KD_1$ ("yes" determination at step S21), the CPU 1 goes to step S22 to change the display style of a position on the staff that corresponds to the to-be-processed pitch information $KD_1$. The "position on the staff that corresponds to the to-be-processed pitch information" means a position of a line or inter-line space representative of the pitch indicated by the pitch information. In some cases, the "position on the staff that corresponds to the to-be-processed pitch information" means a position of a ledger line. Namely, in a case where the pitch information $KD_1$ indicates a pitch higher or lower than the plurality of pitches expressable on the five lines and inter-line spaces, one or more ledger lines necessary for representing the pitch information $KD_1$ are provisionally added, but also the display style of the ledger line or inter-line space corresponding to the pitch information $KD_1$ is changed. Here, changing the display style of the position on the staff that corresponds to the pitch information means making the display style of the line or inter-line space corresponding to the pitch information different from the normal display style. Such a display style change of the line or inter-line space may be made in any of various conventionally-known manners, e.g. by changing a display color, colorfulness, clarity and/or the like of the line or inter-line space as in the aforementioned note display style change. If any of the notes in the musical score image corresponds to the to-be-processed pitch information $KD_1$ ("no" determination at step S21), on the other hand, the CPU 1 proceeds to step S23 without performing the operation of step S22.

(a) and (b) of FIG. 10 are diagrams explanatory of a change of the display style of positions on the staff. More specifically, (a) of FIG. 10 shows a state where the display style of the second line L1 corresponding to the pitch "G" has been changed in response to a key depressing operation performed on the key having the pitch "G" allocated thereto. In (a) of FIG. 10, the lines in the normal display style are depicted by solid line, while the second line L1 changed in the display style is depicted by broken line. Further, (b) of FIG. 10 shows a state where the display style of the second inter-line space corresponding to the pitch "A" has been changed in response to a key depressing operation performed on the key having the pitch "A" allocated thereto. In (b) of FIG. 10, the second inter-line space having been changed in its display style is depicted by hatched line.

Further, at step S23, the CPU 1 resets the pitch information of the register No. J(m) set as the object of processing. At next step S24, the CPU 1 changes the register No. J(m), indicative of a key depression event that is to be processed or should become the next object of processing, to J(m+1). For example, if the preceding object of processing is J(1), J(2) is set as the next or new object of processing. Then, the CPU 1 performs the operations of steps S16 to S24 on the pitch information $KD_{m+1}$ thus set as the new object of processing. Then, the CPU 1 repeats the operations of steps S16 to S24 on all of the key depression events detected at step S2 above, i.e. until the operations of steps S16 to S24 are completed for all of the keys depressed by the user at substantially the same time (namely, until a "yes" determination is made at step S25). If the pitch information $KD_{m+1}$ has not been stored in the register No. J(m+1) that should become the next object of processing ("no" determination at step s25), the CPU 1 judges that the operations of steps S16 to S24 have been completed on all of the detected key depression events and then returns to step S2 of FIG. 3.

Through the aforementioned process of FIG. 7, the CPU 1 identifies each note matching the pitch information $KD_m$ of the detected one or more key depression events J(m) from among the notes included in the musical score image displayed on the display device 6 (steps S17 and S21 above), and changes the display style of all the notes matching the pitches indicated by the pitch information $KD_m$ (step S18 above). Also, for each pitch information $KD_m$ of which there is no note matching the pitches indicated thereby, the CPU 1 changes the display style of a position on the staff that corresponds to the to-be-processed pitch information $KD_m$ (step S22 above). By such visual presentation of correspondence relationship between the individual notes included in the musical score image and the pitches of the individual depressed keys, the user is allowed to readily ascertain, by merely performing a key depressing operation, where the note corresponding to the key of the user-depressed key is in the musical score image, whether the depressed key corresponds to his or her intended note, and which pitches are not present in the music piece in question.

As another example of the operation of step S22 above, the CPU 1 changes the display style of a position on the pitch axis corresponding to the to-be-processed pitch information $KD_m$. Thus, even where the musical score image is not in the staff form, for example, the user can visually ascertain a position on the pitch axis corresponding to the pitch of the depressed key, by just the position on the pitch axis being changed in display style.

As still another example of step S22 above, if no note in the musical score image corresponds to the pitch indicated by the to-be-processed pitch information $KD_m$, the CPU 1 may change the display style of another portion than the notes of the musical score image (i.e., a portion of the musical score image other than the notes in the musical score image). Such another portion than the notes of the musical score image includes, for example, the entire staff section or a background portion (depicted at 50 of FIG. 5) of the musical score image. Changing the display style of another portion than the notes of the musical score image can inform the user that no note corresponding to the depressed key is present in the musical score image. As yet another example of step S22 above, the CPU 1 may change the display style of a particular part corresponding to the to-be-processed pitch information in the other portion than the notes of the musical score image. In this case too, the CPU 1 can inform the user that no note corresponding to the depressed key is present in the musical score image. Also note that, in the case where the pitch of the pitch information $KD_m$ is represented using an added ledger line, the CPU 1 changes the display style of a portion corresponding to the added ledger line or inter-line space representing the pitch information $KD_m$, at step S22. Further, in the case where one or more ledger lines are added to represent pitch information $KD_m$, the CPU 1 may display other ledger lines and/or inter-line spaces than the one or more ledger lines or inter-line space representing the pitch information $KD_m$ in a display style different from the normal display style, at step S22. Where the pitch of the information $KD_m$ is represented by the second lower ledger line, for example, two ledger lines are added below the five lines. In such a case, at step S22, the CPU 1 not only displays the first lower ledger line in a different display style from the normal ledger-line display style, such as by displaying the first lower ledger line in a fainter color than the normal display color, but also changes the display style of a portion corresponding to the second lower ledger line representing the pitch information $KD_m$. In this way, in the case where the display style of a portion corresponding to the pitch indicated by the pitch information $KD_m$ is changed when no note in the musical score image matches the pitch indicated by the pitch information $KD_m$, the user can intuitively know how far the position of the indicated pitch is from the uppermost or lowermost line of the five lines.

FIG. 11 shows an example of a state where the display styles of a plurality of notes and positions on the staff in the musical score image have been changed through the process of FIG. 7. More specifically, in the illustrated example of FIG. 11, the display style of all of the notes indicative of the pitches "C", "E" and "G" and the display style of the position on the staff corresponding to the pitch "B" have been changed in response to depressing operations performed by the user on a plurality of keys. By the individual notes of the plurality of pitches being changed in their display style in the aforementioned manner, the user can readily recognize or grasp, for example, a chord portion, a broken chord, a frequently-occurring performance pattern, a repetitive portion, mutually-similar performance patterns, etc., which can thereby facilitate user's partial practicing and intensive practicing of any desired portions of a music piece. Further, the user can readily grasp the melody line, etc., without taking the trouble of reading the musical score to interpret the music piece. Such advantages can greatly contribute to enhanced efficiency and effectiveness of performance learning of the music piece.

Figures 12, 13:
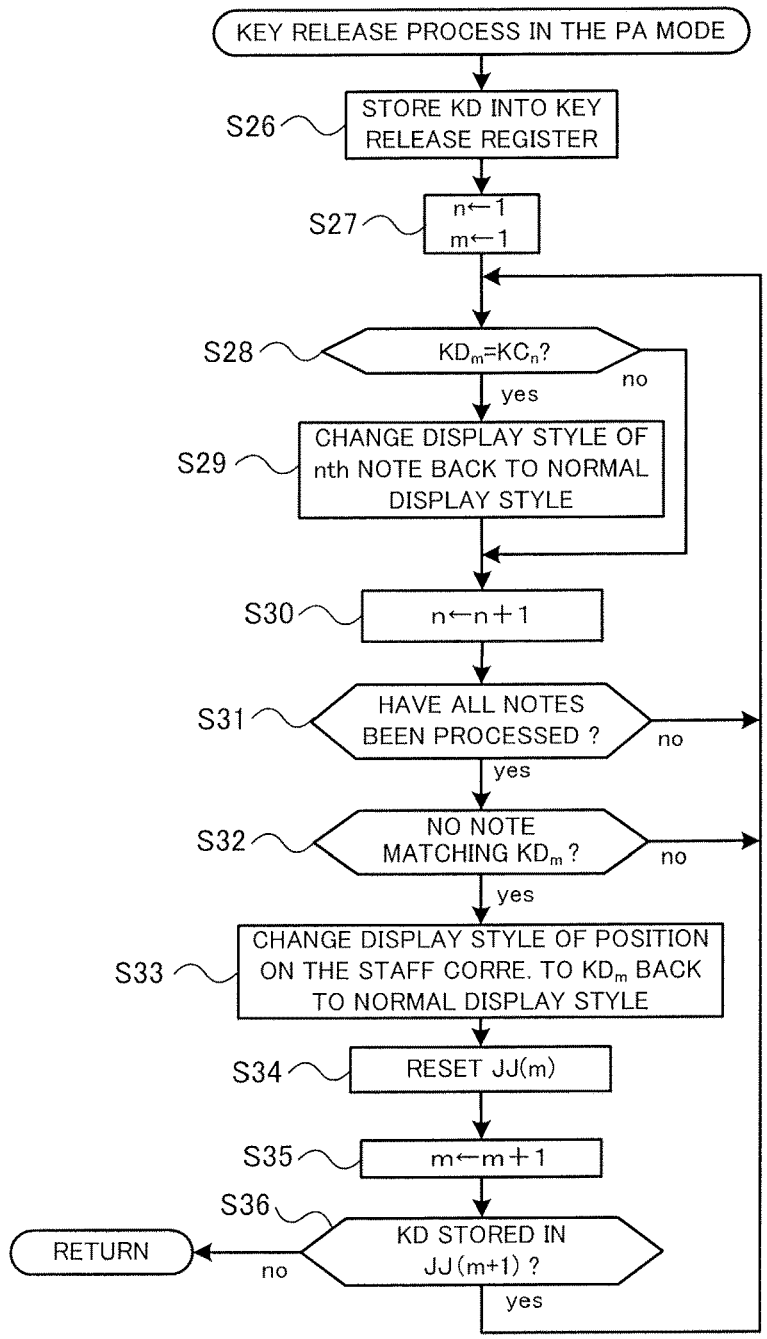
FIG. 12 is a flow chart showing an example of a key release process in the play assist mode.
FIG. 13 is a diagram showing an example construction of a key release register.

When a key releasing operation has been performed in the PA mode ("key release" at step S14 in FIG. 7), on the other hand, the CPU 1 performs a key release process in the PA mode. FIG. 12 is a flow chart of an example of the key release process in the PA mode. At step S26 of FIG. 12, the CPU 1 stores into a key release register pitch information KD indicated by each of the detected key release events. FIG. 13 shows an example construction of the key release register. As shown in FIG. 13, the key release register stores pitch information KD (=$KD_1$, $KD_2$, $KD_3$, . . . ) of the key release events, detected at step S2 above, into respective register Nos. JJ(m=1, 2, 3, . . . ).

At next step S27, the CPU 1 sets, as objects of processing (to-be-processed note and to-be-processed key release event), the note N1 corresponding to the register No. Nn=1 of the note register and the key release event JJ(1) corresponding to the register No. JJ(m)=1 of the key release register. At following step S28, the CPU 1 compares the pitch information $KC_1$ of the note N1 and the pitch information $KD_1$ of the key release event JJ(1), and if the compared two pitch information $KC_1$ and $KD_1$ matches each other ("yes" determination at step S28), the CPU 1 changes the display style of the note N1 back to the normal display style, at step S29. If the compared two pitch information $KC_1$ and $KD_1$ does not match each other ("no" determination at step S28), on the other hand, the CPU 1 proceeds to step S30 without performing the operation of step S29. At step S30, the CPU 1 switches to the register No. N(n+1) indicative of a next or new to-be-processed note and performs the operations of steps S28 to S30 on the new to-be-processed note N(n+1). Then, the CPU 1 repeats the operations of steps S28 to S30 until the operations of steps S28 to S30 are completed on all of z notes appearing in the musical score image (i.e., until a "no" determination is made at step S31).

Then at step S32, the CPU 1 checks all of the pitch information "$KC_1$", "$KC_2$", "$KC_3$", . . . , "$KC_z$" stored in the note register and determines whether none of the notes in the musical score image corresponds to the to-be-processed pitch information $KD_1$. If none of the notes in the musical score image corresponds to the to-be-processed pitch information $KD_1$ ("yes" determination at step S32), the CPU 1 goes to step S33 to change the display style of a position on the staff corresponding to the to-be-processed pitch information $KD_1$ back to the normal display style. If any of the notes in the musical score image corresponds to the to-be-processed pitch information $KD_1$ ("no" determination at step S32), on the other hand, the CPU 1 proceeds to step S34 without performing step S33.

At step S34, the CPU 1 resets the pitch information of the register No. JJ(m) indicative of the to-be-processed key release event. At next step S35, the CPU changes the register No. JJ(m), indicative of the key release event that should become the object of processing (i.e., to-be-processed key release event), to JJ(m+1), and then performs the operations of steps S28 to S35 on the next or new to-be-processed pitch information $KD_{m+1}$. Then, the CPU 1 repeats the operations of steps S28 to S35 on all of the key release events detected at step S2 above until the operations of steps S28 to S35 are completed for all of the key release events (namely, until a "yes" determination is made at step S36). If the pitch information $KD_{m+1}$ has not been stored in the register No. JJ(m+1) that should become the next object of processing, the CPU 1 judges that the operations of steps S28 to S35 have been completed on all of the key release events and then returns to step S2 of FIG. 3.

Through the above-described process of FIG. 12, the CPU 1 can change, in response to a key releasing operation, the display style of a note or position on the staff of a pitch designated by the key releasing operation back to the normal display style (step S29 or S33 above).

As a modification of the display style change by steps S18 and S22 of FIG. 7 above, the CPU 1 may change the display styles of the notes and positions on the staff to display styles differing among the pitches. For example, individual pitches (pitch names) of twelve scale tones in one octave may be changed to different display styles (e.g., different colors). Specifically, in this case, a unique changed-to display style is determined in advance for each of the twelve scale tones, and at steps S18 and S22 above, the CPU 1 determines, on the basis of the pitch information $KD_m$ of the to-be-processed key depression event, which of the changed-to display styles is to be changed to and then changes the display style of the corresponding note or position on the staff to the determined changed-to display style. In this case, same scale tones (pitch names) of different octaves are displayed in the same (changed-to) display style (e.g., same color) despite the different octaves. Needless to say, different scale tones (pitch names) are displayed in different display styles (e.g., different colors) regardless of their octave.

As still another modification of the display style change by steps S18 and S22 of FIG. 7 above, the CPU 1 may change notes and positions on the staff in display styles differing among octaves. For example, twelve pitch names belonging to an octave of pitches C2 to B2 may be all displayed in a same or common display style (e.g., in a given same color), and twelve pitch names belonging to an octave of pitches C3 to B3 may be all displayed in another common display style (e.g., in another same color).

As still another modification, the CPU 1 at step S18 may differentiate the changed-to display style between a plurality of notes constituting a chord or a broken chord and other notes. In this case, at step S18, the CPU 1 determines whether the pitch indicated by the pitch information $KD_m$ of the to-be-processed key depression event is a pitch constituting a chord or a broken chord, determines a changed-to display style on the basis of the result of the determination, and then changes the display style of the note in question to the thus-determined display style. More specifically, the determination as to whether the pitch indicated by the pitch information $KD_m$ of the to-be-processed key depression event is a pitch constituting a chord or a broken chord is made, for example, by identifying in advance the notes constituting the chord or the broken chord and then determining at step S18 whether the note to be processed is any one of the notes constituting the chord or the broken chord. Thus, the chord or the broken chord can be displayed clearly on the musical score image distinctively from other portions of the score image. As a result, significant enhancement of the music piece performance learning effect can be expected.

As still another modification, the changed-to display style may be differentiated between a case where the pitch indicated by the pitch information is of a natural note and a case where or the pitch indicated by the pitch information is of an accidental note. In this case, a changed-to display style for natural notes and a changed-to display style for accidental notes are determined in advance, and, at steps S18 and S22, the CPU 1 determines, on the basis of the pitch information $KD_m$ of the to-be-processed key depression event, which one of pitches of a natural note and an accidental note the pitch indicated by the pitch information is, then determines, on the basis of such a determination, to which one of the display style for natural notes and the display style for accidental notes the display style the display style change is to be made, and then changes the display style of the corresponding note or position on the staff to the thus-determined display style. Differentiating the display style between a natural note corresponding to a while key and an accidental note corresponding to a black key as above can effectively facilitate reading of a musical score of a music piece of which the musical score image includes accidentals, such as sharps and flats.

Further, when the user has made a mistake in dealing with an accidental attached to a certain note, such as when, regarding a note instructed to be raised or lowered by a semitone by an accidental (key signature or accidental mark) on a musical score, the user has depressed a key of a pitch of a natural note erroneously without displacing the natural note pitch by a semitone, for example, the CPU 1 may change that note to a different display style from the "display style of the note" to be changed to at step S18 above. For example, when the pitch $KC_m$ of the to-be-processed note or the pitch information $KD_m$ of the key depression event is of an accidental note, and if the pitch $KC_m$ and the pitch $KD_m$ (i.e., pitches indicated by the pitch information $KC_m$ and $KD_m$) do not match each other as determined at step S17, the CPU further determines whether the pitch names of natural notes of the pitches $KC_m$ and $KD_m$ match each other. If the pitches $KC_m$ and $KD_m$ do not match each other but the pitch names of the natural notes match each other, it can be judged that the user's key depression has made a mistake in dealing with an accidental. If both the pitch names of the natural notes of the pitches $KC_m$ and $KD_m$ match each other, the CPU 1 may change the display style of the note to-be-processed note to still another display style from the display style of the note made at step S18 above. For example, when the note in question is indicative of "C#" and the pitch information $KD_m$ is indicative of "C", then the CPU 1 changes the "C#" note to still another display style. Such arrangements can inform the user that the user's key depression has made a mistake in dealing with the accidental, which is very effective in practicing of a music piece having accidentals (key signature and accidental marks) on the musical score. As an alternative, in the case where the to-be-processed note has an accidental mark and where the pitches indicated by the pitch information indicated by the pitch information $KC_m$ and $KD_m$ do not match each other, the CPU 1 may further determine, at step S17 and for each of notes within a time-axial range where the effect of the accidental mark affects, whether the natural notes of the pitches $KC_m$ and $KD_m$ match each other in their pitch name. Namely, in this description, the "note matching the pitch indicated by the pitch information" also includes a "note of which the pitch name of the natural note matches the pitch name of the natural note corresponding to the pitch information $KD_m$", i.e., a note with an accidental having been judged to match the pitch indicated by the pitch information $KD_m$ within a tolerance of a semitone.

As yet another modification of the display style change by steps S18 and S22 of FIG. 7 above, the CPU 1 may change the display style of the corresponding note or position on the staff to a different display style depending on whether or not the note or position on the staff corresponds to (or is on) the scale of the music piece in question. For example, in changing the display style of the note on the musical score corresponding to the current key depression at step S18, the CPU 1 may determine whether or not the note in question is a scale note of the music piece and then change the display style of the note in a manner differing depending on whether the note is a scale note or not (e.g. by changing the color or luminance or presence/absence of flash). Such arrangements can visually show whether or not the user's key depression is of a performance on the scale of the music piece (such as an ad-lib performance on the scale). Further, as a modification of the above arrangements, the display style change may be effected in a manner differing for each of various scales (e.g. by changing the color or luminance or presence/absence of flashing or blinking). Namely, any one of display-style changing manners differing among various scales may be used as appropriate. For example, in the case of a C major scale, a blue color may be used for displaying a note when the current key depression matches any one of the notes on the musical score, and a blue color may be used for displaying a position on the musical staff when the current key depression does not match any one of the notes on the musical score but corresponds to (or is on) the scale of the music piece. Further, in the case of an F major scale, a red color may be used for displaying a note when the current key depression corresponds to any one of the notes on the musical score, and a red color may be used for displaying a position on the musical staff when the current key depression does not correspond to any one of the notes on the musical score but is on the scale of the music piece.

As yet another modification of the display style change by steps S18 and S22 of FIG. 7 above, the CPU 1 may change the display style of notes and positions on the musical staff to display styles differing among time points at which key depressing operations have been performed (i.e., key depression times). Namely, the CPU 1 may store information of a plurality of pitches designated through a plurality n of previous key depressions into a suitable memory (e.g., ROM 2) and then change the display style of notes and/or positions on the musical staff that correspond to the plurality of pitches designated through the plurality n of previous key depressions to mutually different display styles. For example, when the user has depressed sequentially three keys of pitches "C", "E" and "G", the display style of notes and/or positions on the musical staff that correspond to the pitches "C", "E" and "G" to respective different display styles. In this case, changed-to display styles may be determined in advance for the plurality n of previous key depressions in chronological order, and at steps S18 and S22 above, the CPU 1 determines changed-to display styles in chronological order of key depressions and changes the notes and/or positions on the musical staff, which are of pitches to be processed, to the thus-determined changed-to display styles.

Further, in one embodiment of the invention, the operations for changing the display style of a note or the like back to the normal display style at steps S26 to S36 in FIG. 12 may be performed, for example, upon lapse of a predetermined time period from a detected time of the key release event, rather than at the detected time of the key release event as set forth above in relation to FIG. 12. As an alternative, the operations for changing the display style of a note or the like back to the normal display style may be performed upon lapse of a predetermined time period from the time when the display style of the note or the like was changed (i.e., from a detected time of the key depression event).

In the embodiment shown in FIGS. 2 to 12, it is assumed that the entire musical score image of a single music piece is displayed on one screen of the display device 6. As an alternative, however, only a part of the musical score image of a single music piece may be displayed on one screen of the display device 6. Namely, in this description, the term "musical score image" is used to refer to not only the whole but also a part of a musical score image of a music piece. For example, in a case where a musical score image of a music piece comprises a plurality of pages, the CPU 1 displays the musical score image of one of the plurality of pages at step S12 above. In this case, in storing the pitch information KC of individual notes Nn into the note register, the CPU 1 designates in advance a register No. Nn that stores the pitch of the note NL appearing last in the musical score image of the one page to be displayed on the one screen of the display device 6, or stores into the note register only the pitch information of the notes in the musical score image of the one page displayed on the one screen. Then, at steps S20 and S31, the CPU 1 checks, on the basis of the data stored in the note register, whether the process has been completed up to the last note NL in the musical score image of the one page, to thereby determine whether all of the notes in the musical score image of the one page have been processed. Then, at steps S18 and S22, the CPU 1 changes the display style of the notes and/or positions on the musical score image of the one page. Namely, the CPU 1 identifies, from among the notes included in the part of the musical score image currently being displayed, notes corresponding to the pitches of the depressed keys and changes the display style of the identified notes and/or positions on the staff that correspond to the pitches of the depressed keys.

As another modification, two facing pages of a musical score image comprising a plurality of pages may be displayed on one screen of the display device 6. As still another modification, the aforementioned displaying of a part of the musical score image may comprise displaying only one staff of a grand staff comprising two staves, displaying a part of the musical score in a size enlarged as desired by the user, or the like. Further, the display style of a note and/or position on the musical staff corresponding to a pitch of each depressed key may be changed in interlocked relation to a score-following function that is designed to display on the display device 6, while closely following a user's performance, a part of a musical score image corresponding to a portion that is currently being performed by the user. The "part of a musical score image corresponding to a portion that is currently being performed by the user" is, for example, one line or one measure of the musical score image corresponding to the portion currently being performed by the user, or a plurality n of notes at and before and after the currently-performed portion. Also note that the score-following function is a well-known technique disclosed for example in Japanese Patent Application Laid-open Publication No. 2015-079183.

Furthermore, step S17 of FIG. 7 above may be modified as follows. Namely, if there is any note matching the pitch of the depressed key (to-be-processed pitch information $KD_m$) as determined at step S17, the CPU 1 may not only change the display style of the matching note but also the display style of a position on the staff corresponding to the pitch of the depressed key. Namely, in this case, once the user depresses the key, not only is the display style of the note matching the pitch of the depressed key changed, the display style of the position on the staff corresponding to the pitch of the depressed key is also changed.

As still another modification step S17 of FIG. 7 above, if there is any note matching the pitch of the depressed key (to-be-processed pitch information $KD_m$) as determined at step S17, the CPU 1 may change the display style of the position on the staff corresponding to the pitch of the depressed key without changing the display style of the matching note. Namely, even when there is any note matching the pitch of the depressed key (to-be-processed pitch information $KD_m$), the process may be arranged to change the display style of another portion of the musical score image than the notes without changing the display style of the matching note. In this case, by the display style of the position on the staff corresponding to the pitch of the depressed key being changed as above, the user can visually ascertain correspondence relationship between the notes in the musical score image and the pitch of the depressed key.

Figure 14:
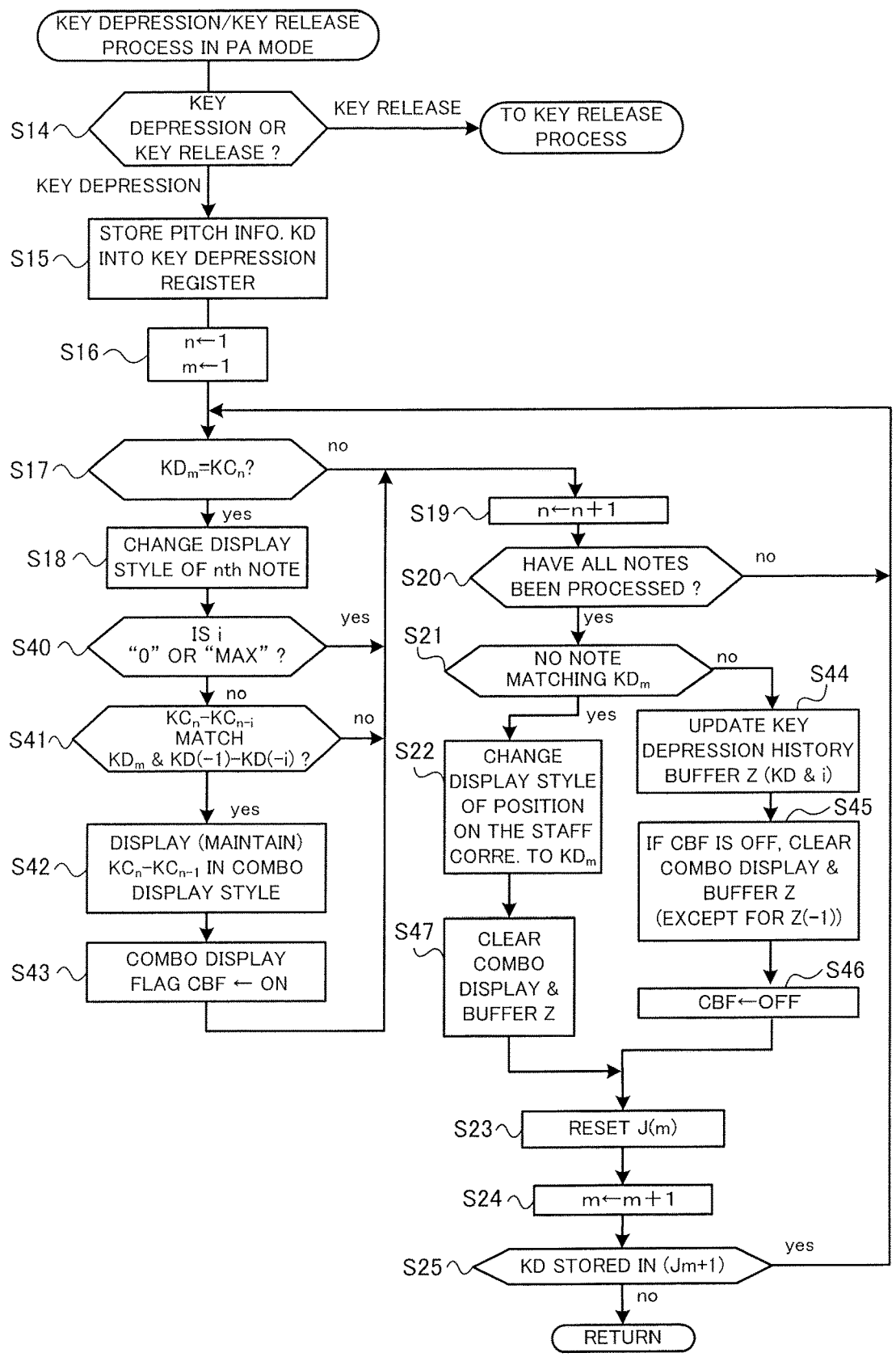
FIG. 14 is a flow chart showing another example of the key depression process in the play assist mode.

Further, as another embodiment of the invention, a determination may be made as to whether or not a right time series of key depressing operations (i.e., right time-serial key depressing operations) matching a time series of notes (i.e., time-serial notes) on the musical score have been performed, and if a result of the determination shows that the right time-serial key depressing operations have been performed, a display may be made, in relation to the time-serial notes on the musical score, in a special display style (that highlights these notes). FIG. 14 is a flow chart showing such an embodiment, which is depicted as a modification of FIG. 7. The same reference characters as in FIG. 7 represent steps of the same functions as the steps shown in FIG. 7 and thus will not be described in detail here to avoid unnecessary duplication. The embodiment of FIG. 14 further uses a key depression history buffer Z as illustrated in FIG. 15. The key depression history buffer Z stores in a register Z(0) a variable i indicative of the number of successive matches, and an initial value of the variable i is "0". A plurality of registers Z(-1), Z(-2), Z(-3), . . . in the key depression history buffer Z store, in time-serial order, pitch information KD(-1), KD(-2), KD(-3), . . . corresponding to right time-serial key depressing operations matching a time series of notes on the musical score. An initial value of each of these pitch information KD(-1), KD(-2), KD(-3), . . . is "0".

In FIG. 14, steps S40 to S43 are inserted between steps S18 and S19, steps S44, S45 and S46 are inserted in the "NO" branch from step S21, and step S47 is inserted between steps S22 and S23. Once it is determined at step S17 that the pitch information of the depressed key currently being processed matches the note KCn on the musical score, the CPU 1 proceeds to S40 by way of the operation of step S18. At step S40, the CPU 1 further determines whether the value of the variable i currently stored in the register is "0" or a predetermined maximum value MAX (e.g., 31). If the value of the variable i is "0" as determined at step S40, the CPU 1 goes from a "YES" determination at step S40 to step S19. Then, once a "NO" determination is made at step S21 by way of the operations of steps S19 and S20, the CPU 1 proceeds to step S44. At step S44, the CPU 1 updates the stored content of the key depression history buffer Z. More specifically, the CPU 1 increments the value of the variable i by one and shifts the respective stored content of the registers Z(-1), Z(-2), Z(-3), . . . sequentially downward (i.e., to the registers of immediately succeeding stages or orders) so that the pitch information KDm currently being processed is stored into the uppermost-order register Z(-1); more specifically, the stored content of the register Z(-3) is shifted to the next-order registers Z(-4), the stored content of the register Z(-2) is shifted to the next-order registers Z(-3), the stored content of the register Z(-1) is shifted to the next-order registers Z(-2), and the pitch information KDm currently being processed is stored into the now-emptied register Z(-1). When the stored content of all of the registers Z(-1), Z(-2), Z(-3), . . . is "0", only the currently processed pitch information KDm is stored into the register Z(-1). That the currently processed pitch information KDm has been stored into the register Z(-1) means that the pitch information KDm matches the note KCn on the musical score. The pitch information KDm stored in the register Z(-1) will hereinafter be represented by KD(-1). This means that, when the process is about to be performed on next or new pitch information KDm on the next occasion, the pitch information KDm immediately preceding the new pitch information KDm is currently stored in the register Z(-1). Similarly, the pitch information stored in the registers Z(-2), Z(-3), . . . will hereinafter be represented by KD(-2), KD(-3), . . . , respectively. This means that, when the process is about to be performed on the new pitch information KDm on the next occasion, the previous pitch information KDm, such as the second previous pitch information, third previous pitch information, . . . are stored in the registers Z(-2), Z(-3), . . . respectively. Following step S44, the CPU 1 performs operations of steps S45 and S46 as will be described in detail later, and then it proceeds to step S23.

Once the value of the variable i is incremented by one at step S44, a "NO" determination is made at step S40 if the value of the variable i is not the maximum value MAX when the operation of step S40 is performed on the next occasion, so that the CPU 1 goes to step S41. At step S41, the CPU 1 compares 1) a pitch sequence from the note KCn on the musical score corresponding to the current value n to another note KCn-i on the musical score preceding the note KCn by the value of the variable i (this sequence will be represented by "KCn-KCn-i") and 2) the current pitch information KDm and pitch information KD(-1)-KD(-i) currently stored in the key depression history buffer Z from the register Z(-1) to the register Z(-i) corresponding to the value of the variable i, to thereby determine whether all of the pitch information matches the pitch sequence. Namely, if there is, on the musical score, a group of notes comprising a pitch sequence that matches the sequence of the pitch information KDm and pitch information KD(-1)-KD(-i) corresponding to the most recent (i+1) key depressing operations, then a "YES" determination is made at step S41. For example, if pitches of keys sequentially depressed in a time series are "C, E, G" and if there is a time-serial pitch sequence of "C, E, G" as a group of notes on the musical score, then step S41 determines (makes a "match" determination) that the pitches of the sequentially depressed keys match the time-serial pitch sequence present on the musical score. Thus, step S41 functions as a determination circuitry which determines whether or not a plurality of time-serial pitches indicated by the acquired pitch information match a plurality of time-serial notes included in the musical score.

Next, at step S42, the CPU 1 displays the group of notes of the pitch sequence "KCn-KCn-i" on the score, having been determined to match at step S41, in a special display style (hereinafter referred to as "combo display", for convenience) that is intended to distinguish (highlight) that group of notes. For example, if right key depressing operations are performed in association with the first and second notes N1 and N2 in the case where the musical score image comprising the melody line as shown in FIGS. 9 and 10, these two notes N1 and N2 are displayed in the special display style, i.e., in the "combo display" style, as shown in (a) of FIG. 16; and as an example, the special display style comprises encircling the notes N1 and N2 with dotted lines D1. Step S42 functions as a control circuitry which, when step S41 has made a "match" determination, executes a special display for highlighting the plurality of time-serial notes displayed in the musical score image.

Next, the CPU 1 sets a combo display flag CBF to an ON state at step S43 and then proceeds to step S19. After that, the CPU 1 proceeds from step S19 to step S20, so that it repeats the operations of steps S17 to S20, while returning to step S17 in response to a "no" determination of step S20, until the process is completed on all of z notes appearing in the musical score image. In the illustrated example of (a) of FIG. 16, the key of pitch "G" is depressed in association with the note N2, and thus, the display style of the notes N1, N2, N4 and N7 corresponding to pitch "G" is changed through the operation of step S18.

From the "yes" determination of step S20, the CPU 1 goes to step S21. Once it is determined at step S21 that there is any note matching the current key depression information KDm (i.e., depressed key of pitch "G" corresponding to the note N2 in the illustrated example of (a) of FIG. 16), the CPU 1 goes to step S44, where it updates the stored content of the key depression history buffer Z. In the illustrated example of (a) of FIG. 16, by such updating, information indicative of the pitch "G" is stored into the register Z(−1) as currently-processed pitch information KDm, and information indicative of the pitch "G" is stored into the register Z(−2) as immediately-preceding pitch information KD(−1).

Then, at step S45, if the combo display flag CBF is in an OFF state, the CPU 1 clears the combo display and the stored content of the key depression history buffer Z except for the content of the register Z(−1). In the illustrated example of (a) of FIG. 16, however, the clearing operation of step S45 is not performed because the combo display flag has been set to the ON state at step S43. Namely, if the combo display has been executed in response to the current key depression, the combo display is maintained, and the updated stored content of the key depression history buffer Z is maintained. Following step S45, the CPU 1 proceeds to step S46. The CPU 1 resets the combo display flag CBF to the OFF state at step S46 and then goes to step S23.

Namely, through the aforementioned process, the combo display as shown in (a) of FIG. 16 is executed and maintained if right key depressing operations have been performed sequentially in association with the first and second notes N1 and N2.

Then, once the third key depressing operation is performed and if such a third key depressing operation is right key depression of pitch "C" corresponding to the third note N3, the CPU 1 compares 1) the note sequence of KCn, KCn-1 and KCn-2 (pitches "C", "G" and "G") on the musical score when n=3 and 2) the current pitch information KDm and pitch information KD(−1) and KD(−2) (pitches "C", "G" and "G"), and thereby determines that all of the pitch information matches the note sequence on the musical score. In response to such a determination, a combo display D2 as shown in (b) of FIG. 16 is executed at step S42, and the combo display flag CBF is set to the ON state at step S43. After that, the stored content of the key depression history buffer Z is updated at step S44. Namely, through the aforementioned process, the combo display as shown in (b) of FIG. 16 is executed and maintained if right key depressing operations have been performed sequentially in association with the first, second and third notes N1, N2 and N3.

Then, once the fourth key depressing operation is performed and if such a fourth key depressing operation is of a key present on the musical score (such as a key of pitch "F") although it is not right key depression (of pitch "G") corresponding to the fourth note N4, the display style of a note N8 on the musical score is changed through the operation of step S18 as shown in FIG. 16(c). Also, through the operations of steps S44 and S45, the combo display D2 is cleared, only the stored content of the register Z(−1) of the key depression history buffer Z is updated with the currently-processed pitch information KDm, and the other stored content of the key depression history buffer Z is cleared. Namely, because the combo display flag CBF remains in the OFF state, the combo display and the buffer Z are cleared at step S45.

Further, once the fourth key depressing operation is performed and if such a fourth key depressing operation is not right key depression (of pitch "G") corresponding to the fourth note N4 and is of a key (such as a key of pitch "D") not present on the musical score in the illustrated example of FIG. 16, then a "yes" determination is made at step S21, so that the CPU 1 executes a predetermined display style change at step S22 and then proceeds to step S47. At step S47, the CPU 1 clears the combo display D2 having been maintained so far and clears all the content of the combo display and the buffer Z. After that, the CPU 1 proceeds to step S23.

The embodiment of FIG. 14 constructed in the above-described manner can visually display the correctness of user's time-serial key depressing operations and thus can significantly enhance user's motivation for a musical instrument performance. Further, because the embodiment of FIG. 14 can visually indicate where on the musical score a time-serial scale variation pattern performed by the user is present, it can help the user to understand the construction of the music piece in question. Furthermore, according to the embodiment of FIG. 14, in a case where a same scale variation pattern is present at a plurality of portions on the musical score, the combo display is executed at the plurality of portions on the musical score. Thus, the embodiment of FIG. 14 achieves the advantageous benefit that how a characteristic scale variation pattern, which the user may get interested in, is placed on the musical score can be visually displayed in response to a user's interactive operation. Also note that the operations of step S18 and/or step S22 may be omitted if only the combo display is to be executed, in the embodiment of FIG. 14.

As another embodiment of the invention, the performance assistance device 100 of the present invention may be implemented by a system where the function of at least one of the display 102, acquisition circuitry 104, identification circuitry 106 and display control circuitry 108 is performed by another device than the electronic keyboard musical instrument 200, and where such other device and the electronic keyboard musical instrument 200 cooperate with each other. Further, in the present invention, the functions (of the display 102, acquisition circuitry 104, identification circuitry 106 and display control circuitry 108) may be shared between or among a plurality of devices in any desired combination.

For example, a musical score image may be displayed on a display device provided in the peripheral equipment 16, such as iPad (registered trademark), connected to the performance assistance device 100 via the peripheral equipment I/F 9. For example, in this case, the electronic keyboard musical instrument 200 performs the functions of the acquisition circuitry 104, identification circuitry 106 and display control circuitry 108, while the peripheral equipment 16 performs the function of the display 102. The CPU 1 of the electronic keyboard musical instrument 200 at step S12 transmits musical score data, read out from the memory 2, 3 or 8, to the peripheral equipment 16, such as an iPad (registered trademark), via the peripheral equipment I/F 9. The peripheral equipment I/F 9 displays, on the display device provided therein, a musical score image based on the musical score data received from the electronic keyboard musical instrument 200. The CPU 1 of the electronic keyboard musical instrument 200 performs a process for, in response to an operation on the keyboard (key operation), changing the display style of a note or position on the musical staff corresponding to a pitch of a depressed key (see FIG. 7 or 12) and then transmits to the peripheral equipment 16 a display style change instruction corresponding to a result of the process. On the basis of such a display style change instruction received from the electronic keyboard musical instrument 200, the peripheral equipment 16 changes the display style of the note or position on the musical staff in the musical score image displayed on the display device provided therein. Note that, in this case, the musical score data may be stored in a memory provided in the peripheral equipment 16, such as an iPad (registered trademark).

As still another embodiment of the invention, the electronic keyboard musical instrument 200 may perform the function of the acquisition circuitry 104, while the peripheral equipment 16, such as an iPad (registered trademark), may perform the functions of the display 102, acquisition circuitry 104, identification circuitry 106 and display control circuitry 108. In this case, the electronic keyboard musical instrument 200 transmits pitch information, corresponding to a key operation, to a portable terminal (peripheral equipment 16), such as an iPad (registered trademark), via the peripheral equipment I/F 9. On the basis of the pitch information received from the electronic keyboard musical instrument 200, the peripheral equipment 16 performs a process for changing the display style of a note or position in the musical score image displayed on the display device provided therein.

As still another embodiment of the invention, the function for inputting pitch information may be performed by another electronic musical instrument (such as MIDI equipment 17) externally connected to the electronic keyboard musical instrument 200, or the peripheral equipment 16, such as an iPad (registered trademark). In such a case, the user performs a performance operation by use of a performance operator unit provided in the MIDI equipment 17, or by use of an image of a GUI operator displayed on a display device of an iPad (registered trademark) or the like. The MIDI equipment 17 or the peripheral equipment 16 generates pitch information in response to such a user's performance operation. The electronic keyboard musical instrument 200 acquires the pitch information generated by the MIDI equipment 17 or the peripheral equipment 16 and performs a process (functions of the identification circuitry 106 and display control circuitry 108) for changing, on the basis of the acquired pitch information, the display style of a note or position on the musical staff in the musical score image.

Also note that the performance operator unit for inputting pitch information is not necessarily limited to a keyboard type. Namely, the performance operator unit may be any desired type, such as a wind instrument type like a so-called wind synthesizer, a pad type having pads to be struck by the user, and a guitar type, as long as it allows performance information of the MIDI format to be input as pitch information.

Further, as an example, the aforementioned embodiment where the performance assistance device 100 is implemented by a system comprising a plurality of mutually cooperating devices may be constructed in such a manner that a musical score image is displayed on a display device of one peripheral equipment 16 externally connected to the electronic keyboard musical instrument 200, pitch information is input by use an image of a GUI operator displayed on a display device of another peripheral equipment 16 externally connected to the electronic keyboard musical instrument 200, and the electronic keyboard musical instrument 200 performs a process for changing, on the basis of the acquired pitch information, the display style of a note or position on the musical staff in the musical score image.

As yet another embodiment of the invention, the pitch information may be one based on an audio signal generated by a natural musical instrument. Namely, the device (electronic keyboard musical instrument 200, peripheral equipment 16, MIDI equipment 17 or the like) performing the function of the acquisition circuitry 104 receives the audio signal generated by the natural musical instrument, performs a well-known pitch detection process and sound (tone) length detection process on the received audio signal, and generates pitch information (note event information) of, for example, the MIDI format on the basis of the predetermined pitch detection and sound (tone) length detection processes. For that purpose, there may be employed any desired conventionally-known pitch detection process or technique, such as a plural-tone-pitch extraction technique for extracting respective pitches of a plurality of tones generated substantially simultaneously and contained in an audio signal as disclosed, for example, in Japanese Patent Application Laid-open No. 2008-058753. Further, the natural musical instrument may be any type of natural musical instrument, such as a saxophone, guitar or acoustic piano. As an alternative, the audio signal to be received by the acquisition circuitry 104 may be a signal of voice uttered by the user. Furthermore, as an additional function, a musical score may be created on the basis of the pitch information (note event information) obtained from the audio signal received by the acquisition circuitry 104. In this way, it is possible to create a musical score of a music piece sung by the user in a freely-selected fashion or as he or she pleases.

Further, as yet another embodiment of the invention, a musical score image may be displayed in a Web browser activated on the display device 6. Namely, in this case, the electronic keyboard musical instrument 200 activates the Web browser on the display device 6, and it accesses a server computer on the communication network 18 via the commmunication I/F 11 and requests the server computer to display a musical score image of a desired music piece. The server computer has musical score data of a plurality of music pieces prestored therein and transmits any of the musical score data to the electronic keyboard musical instrument 200 in response to a request from the instrument 200. Then, the electronic keyboard musical instrument 200 displays in the Web browser a musical score image based on the musical score data received from the server computer. Then, in response to an operation on the keyboard (keyboard operation, such as a key depressing operation), the CPU 1 of the electronic keyboard musical instrument 200 changes the display style of a note or position on the musical staff corresponding to the depressed key. In another embodiment, the server computer may perform the functions of the identification circuitry 106 and display control circuitry 108. In such a case, the electronic keyboard musical instrument 200 transmits to the server computer pitch information corresponding to the keyboard operation. On the basis of the pitch information received from the electronic keyboard musical instrument 200, the server computer performs a process for changing the display style of a note or position on the staff and instructs the keyboard musical instrument 200 to execute a display style change on the staff corresponding to a result of the process. In accordance with such an instruction from the server computer, the electronic keyboard musical instrument 200 changes the display style of the note or position on the staff in the musical score image displayed in the web browser.

Note that the display of the musical score image (i.e., function of the display 102) and the access to the server computer may be executed, for example, by the peripheral equipment 16, such as an iPad (registered trademark) or a personal computer, rather than by the electronic keyboard musical instrument 200.

Whereas various embodiments of the present invention have been described above in detail, it should be appreciated that the present invention is not necessarily limited to the above-described embodiments and may be modified variously within the scope of the technical ideal disclosed in the claims, description and drawings.

For example, the musical score image in the present invention is not limited to an image of a musical staff type alone and may be of any other desired type, such as a chord chart type, guitar tablature type or drum tablature, as long as it is an image where individual notes constituting a music piece are placed or arranged on the time axis and pitch axis. Note that the chord chart is a musical score where symbols representative of chords are arranged in the time-axial direction. In the case of the chord chart, the CPU 1 at steps S16 to S25 changes the display style of a chord symbol in the chord chart that matches an acquired chord, such as a chord performed by the user; if there is no chord symbol matching the acquired chord, the CPU changes the display style of another portion of the chord chart than the chord symbols, such as a background portion of the chord chart. In a case where pitch information based on an audio signal representative of chord performance tones is to be acquired, the plural-tone-pitch extraction technique disclosed in Japanese Patent Application Laid-open No. 2008-058753 may be employed. Further, in the musical score image of a musical staff type or the like, notes of individual tones constituting a music piece may be represented, for example, by pictures of animals etc. for infant children and the like.

Furthermore, the musical score image displayed on the display device 6 may have, in its suitable portion such as a lower portion of the screen, an area that displays individual pitch names of a diatonic scale, such as "C-D-E-F-G-A-B", accidentals, etc. This area is constructed in such a manner that it usually displays nothing but, when pitch information has been acquired in response to key depression or the like, it displays a pitch name etc. corresponding to the acquired pitch information. Also note that "changing the display style of another portion than the notes of the musical score image" and "changing the display style of a particular part corresponding to the pitch information in the other portion than the notes of the musical score image" include, for example, displaying the pitch name in this area, or displaying the pitch name, displayed in this area, in another display style than that employed in the case where there is a matching note.

Furthermore, the performance assistance device 100 of the present invention may be implemented by a device having no hardware performance operator unit (i.e., a device that is not a musical instrument), such as an iPad (registered trademark) or a personal computer. Moreover, the musical score data in the present invention may be data, such as mere image data, having no note data as set forth above. In such a case, the pitch information KC of each note may be acquired in some suitable way, such as by analyzing the musical score based on the musical score data. Further, in such a case, changing of the display style of a note or the like may be executed, for example, by generating image data representative of a musical score having the display style of a relevant portion changed.

What is more, the present invention may be constructed and implemented not only as a device or apparatus as described above, but also a performance assistance method which comprises: a step of displaying, on a display device, a musical score image based on musical score data for displaying a musical score image where notes indicative of individual tones or sounds, constituting a music piece, are arranged on a time axis and a pitch axis; a step of acquiring pitch information indicative of one or more pitches; a step of identifying, from among the notes included in the musical score image, each note matching any one of the one or more pitches indicated by the acquired pitch information; and a step of changing, when there is any note having been identified as matching any one of the one or more pitches indicated by the acquired pitch information, a display style of the identified note, and changing, when there is no note having been identified as matching any one of the one or more pitches indicated by the acquired pitch information, a display style of a portion of the musical score image other than the notes.

Furthermore, the present invention may be constructed and implemented as a program for causing a computer to perform: a step of displaying, on a display device, a musical score image based on musical score data for displaying a musical score image where notes indicative of individual sounds or sounds, constituting a music piece, are arranged on a time axis and a pitch axis; a step of acquiring pitch information indicative of one or more pitches; a step of identifying, from among the notes included in the musical score image, each note matching any one of the one or more pitches indicated by the acquired pitch information; and a step of changing, when there is any note having been identified as matching any one of the one or more pitches indicated by the acquired pitch information, a display style of the identified note, and changing, when there is no note having been identified as matching any one of the one or more pitches indicated by the acquired pitch information, a display style of a portion of the musical score image other than the notes.

What is claimed is:
1. A performance assistance device comprising:
a display device which displays a musical score image based on musical score data for displaying a musical score image where notes indicative of individual sounds constituting a music piece are arranged on a time axis and a pitch axis;
an acquisition circuitry which acquires pitch information indicative of one or more pitches; and
a processor configured to:
  identify, from among the notes included in the musical score image, each note matching any one of the one or more pitches indicated by the acquired pitch information;
  change, when any note has been identified as matching any one of the one or more pitches indicated by the acquired pitch information, a display style of a note image itself of the identified note in the musical score image; and
  change, along the time axis, only when no note has been identified as matching any one of the one or more pitches indicated by the acquired pitch information, a display style of one or more particular parts indicative of one or more positions on the pitch axis corresponding to the one or more pitches indicated by the acquired pitch information in a portion of the musical score image other than the notes.

2. The performance assistance device as claimed in claim 1, wherein the musical score image is an image comprising a musical staff where the notes corresponding to the individual sounds constituting the music piece are arranged on a five-line staff.

3. The performance assistance device as claimed in claim 2, wherein, only when no note has been identified as matching any one of the one or more pitches indicated by the acquired pitch information, the processor changes a display style of one or more horizontal lines or inter-line spaces on the musical staff corresponding to the one or more pitches indicated by the pitch information.

4. The performance assistance device as claimed in claim 1, wherein the processor is further configured to:
  determine whether or not a plurality of time-serial pitches indicated by the acquired pitch information match a plurality of time-serial notes included in the musical score image; and
  upon determination that the plurality of time-serial pitches match the plurality of time-serial notes, execute a display for highlighting the plurality of time-serial notes displayed in the musical score image.

5. The performance assistance device as claimed in claim 1, wherein the processor is configured to determine whether or not the one or more pitches indicated by the acquired pitch information are scale notes of the music piece, change the display style of the matching note in a manner differing depending on whether or not the one or more pitches indicated by the acquired pitch information are scale notes of the music piece, and also change the display style of the portion of the musical score image other than the notes.

6. A performance assistance method which comprises:
  displaying, on a display device, a musical score image based on musical score data for displaying a musical score image where notes indicative of individual sounds, constituting a music piece, are arranged on a time axis and a pitch axis;
  acquiring pitch information indicative of one or more pitches;
  identifying, from among the notes included in the musical score image, each note matching any one of the one or more pitches indicated by the acquired pitch information; and
  changing, when any note has been identified as matching any one of the one or more pitches indicated by the acquired pitch information, a display style of a note image itself of the identified note in the musical score image; and
  changing, along the time axis, only when no note has been identified as matching any one of the one or more pitches of the notes indicated by the acquired pitch information, a display style of one or more particular parts indicative of one or more positions on the pitch axis corresponding to the one or more pitches indicated by the acquired pitch information in a portion of the musical score image other than the notes.

7. A non-transitory computer-readable storage medium storing a group of instructions executable by a processor for performing a performance assistance method which comprises:
  displaying, on a display device, a musical score image based on musical score data for displaying a musical score image where notes indicative of individual sounds, constituting a music piece, are arranged on a time axis and a pitch axis;
  acquiring pitch information indicative of one or more pitches;
  identifying, from among the notes included in the musical score image, each note matching any one of the one or more pitches indicated by the acquired pitch information; and
  changing, when any note has been identified as matching any one of the one or more pitches indicated by the acquired pitch information, a display style of a note image itself of the identified note in the musical score image; and
  changing, along the time axis, only when no note has been identified as matching any one of the one or more pitches of the notes indicated by the acquired pitch information, a display style of one or more particular parts indicative of one or more positions on the pitch axis corresponding to the one or more pitches indicated by the acquired pitch information in a portion of the musical score image other than the notes.

8. The performance assistance device as claimed in claim 1, wherein, when any note has been identified as matching any one of the one or more pitches indicated by the acquired pitch information, the processor changes the display style of the identified note by changing only a part of the note image of the identified note in the musical score image.

9. The performance assistance device as claimed in claim 8, wherein the processor changes a display style of a notehead of the note image of the identified note in the musical score image.

10. The performance assistance device as claimed in claim 1, wherein, when any note has been identified as matching any one of the one or more pitches indicated by the acquired pitch information, the processor changes the display style of the note image itself of the identified note without changing a display style of a part indicative of a position on the pitch axis corresponding to the identified note in the musical score image.

11. A performance assistance device comprising:
  a display device which displays a musical score image based on musical score data for displaying a musical score image where notes indicative of individual sounds constituting a music piece are arranged on a time axis and a pitch axis;
  an acquisition circuitry which acquires pitch information indicative of one or more pitches; and a processor configured to:
  identify, from among the notes included in the musical score image, each note matching any one of the one or more pitches indicated by the acquired pitch information;
  change, when any note has been identified as matching any one of the one or more pitches indicated by the acquired pitch information, changes a display style of the identified note;
  change, when no note has been identified as matching any one of the one or more pitches indicated by the acquired pitch information, a display style of a portion of the musical score image other than the notes;
  determine whether or not a plurality of time-serial pitches indicated by the acquired pitch information match a plurality of time-serial notes included in the musical score image; and
  upon determination that the plurality of time-serial pitches match the plurality of time-serial notes, execute a display for highlighting the plurality of time-serial notes displayed in the musical score image.

12. A performance assistance method which comprises:
  displaying, on a display device, a musical score image based on musical score data for displaying a musical score image where notes indicative of individual sounds, constituting a music piece, are arranged on a time axis and a pitch axis;
  acquiring pitch information indicative of one or more pitches;
  identifying, from among the notes included in the musical score image, each note matching any one of the one or more pitches indicated by the acquired pitch information;
  changing, when any note has been identified as matching any one of the one or more pitches indicated by the acquired pitch information, a display style of the identified note;
  changing, when no note has been identified as matching any one of the one or more pitches of the notes indicated by the acquired pitch information, a display style of a portion of the musical score image other than the notes;
  determining whether or not a plurality of time-serial pitches indicated by the acquired pitch information match a plurality of time-serial notes included in the musical score image; and
  upon determination by the step of determining that the plurality of time-serial pitches match the plurality of time-serial notes, executing a display for highlighting the plurality of time-serial notes displayed in the musical score image.

13. A non-transitory computer-readable storage medium storing a group of instructions executable by a processor for performing a performance assistance method which comprises:
  displaying, on a display device, a musical score image based on musical score data for displaying a musical score image where notes indicative of individual sounds, constituting a music piece, are arranged on a time axis and a pitch axis;
  acquiring pitch information indicative of one or more pitches;
  identifying, from among the notes included in the musical score image, each note matching any one of the one or more pitches indicated by the acquired pitch information;
  changing, when any note has been identified as matching any one of the one or more pitches indicated by the acquired pitch information, a display style of the identified note;
  changing, when no note has been identified as matching any one of the one or more pitches of the notes indicated by the acquired pitch information, a display style of a portion of the musical score image other than the notes;
  determining whether or not a plurality of time-serial pitches indicated by the acquired pitch information match a plurality of time-serial notes included in the musical score image; and
  upon determination by the step of determining that the plurality of time-serial pitches match the plurality of time-serial notes, executing a display for highlighting the plurality of time-serial notes displayed in the musical score image.

* * * * *